United States Patent [19]

Rodal

[11] Patent Number: 4,672,474
[45] Date of Patent: Jun. 9, 1987

[54] SYNTHETIC CONTROL TRACK SIGNAL PRODUCING APPARATUS FOR VIDEO TAPE MACHINES

[75] Inventor: David R. Rodal, Palo Alto, Calif.

[73] Assignee: Ampex Corporation, Redwood City, Calif.

[21] Appl. No.: 736,483

[22] Filed: May 20, 1985

Related U.S. Application Data

[63] Continuation of Ser. No. 418,865, Sep. 16, 1982, abandoned.

[51] Int. Cl.⁴ .................. G11B 15/52; G11B 27/02; H04N 5/78
[52] U.S. Cl. ........................ 360/70; 358/311; 358/314; 358/321; 358/327; 358/336; 358/338; 360/14.1; 360/38.1; 360/73
[58] Field of Search .............. 358/311, 314, 321, 327, 358/336, 338; 360/14.1, 38.1, 70, 73

[56] References Cited

U.S. PATENT DOCUMENTS

| Re. 29,787 | 9/1978 | Bargen | 358/4 |
|---|---|---|---|
| 3,821,803 | 6/1974 | Sakamoto | 360/73 |
| 3,959,818 | 5/1976 | Iketaki | 360/70 |
| 3,990,108 | 11/1976 | Suga et al. | 360/73 |
| 4,151,566 | 4/1979 | Ohrman | 360/72.1 |
| 4,296,446 | 10/1981 | Zorbalas | 360/73 |
| 4,390,977 | 6/1983 | Onigata et al. | 369/50 |
| 4,409,628 | 10/1983 | Frimet et al. | 360/73 |

FOREIGN PATENT DOCUMENTS 0057074  8/1982  European Pat. Off. ........... 360/14.1

Primary Examiner—George G. Stellar
Attorney, Agent, or Firm—Roger D. Greer; Ralph L. Mossino; Joel D. Talcott

[57] ABSTRACT

A synthetic control track signal is provided for a magnetic video tape recording and/or reproducing machine having a motor driven capstan and capstan servo which controls the speed of the tape during recording and reproducing. The synthetic signal enables the capstan servo to operate when the control track signal has not been recorded or has been improperly recorded. The synthetic signal is generated from vertical synchronization information extracted from the video information extracted signal.

32 Claims, 5 Drawing Figures

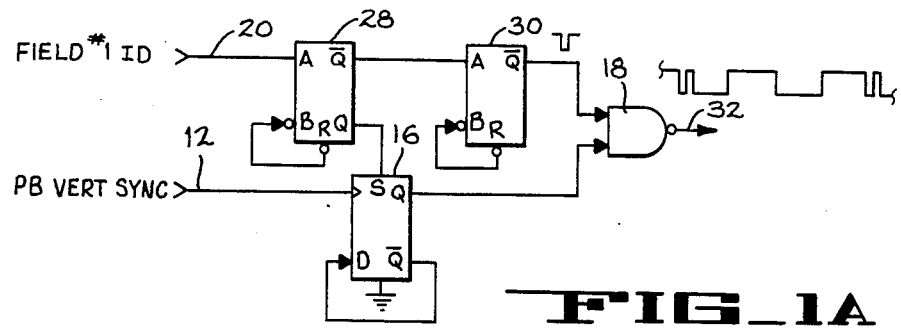
FIG_1A
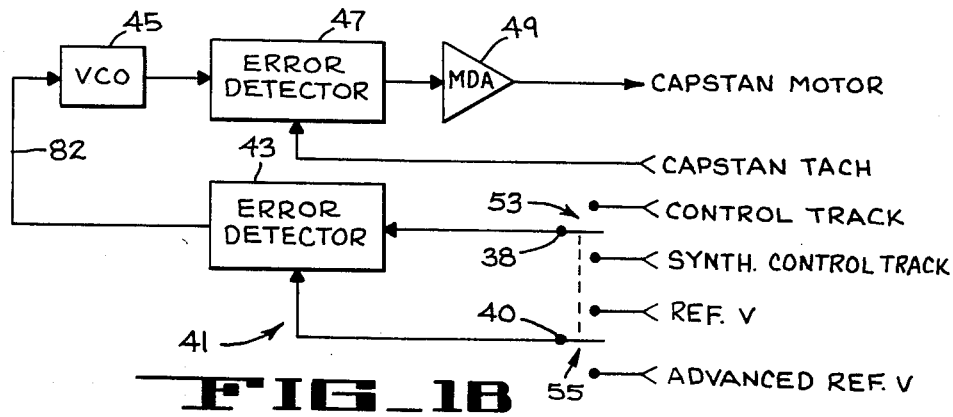
FIG_1B
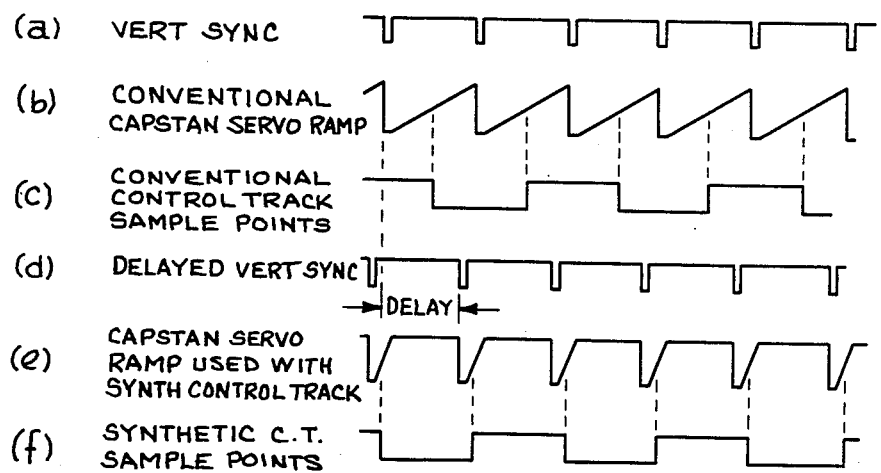
FIG_2

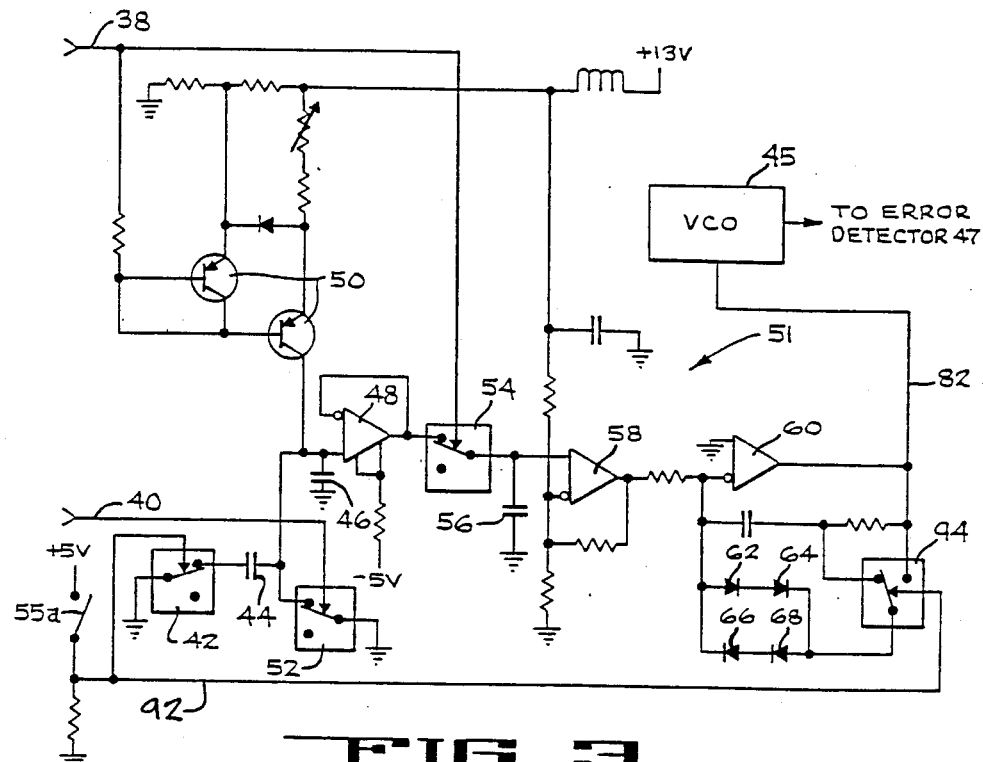
FIG_3
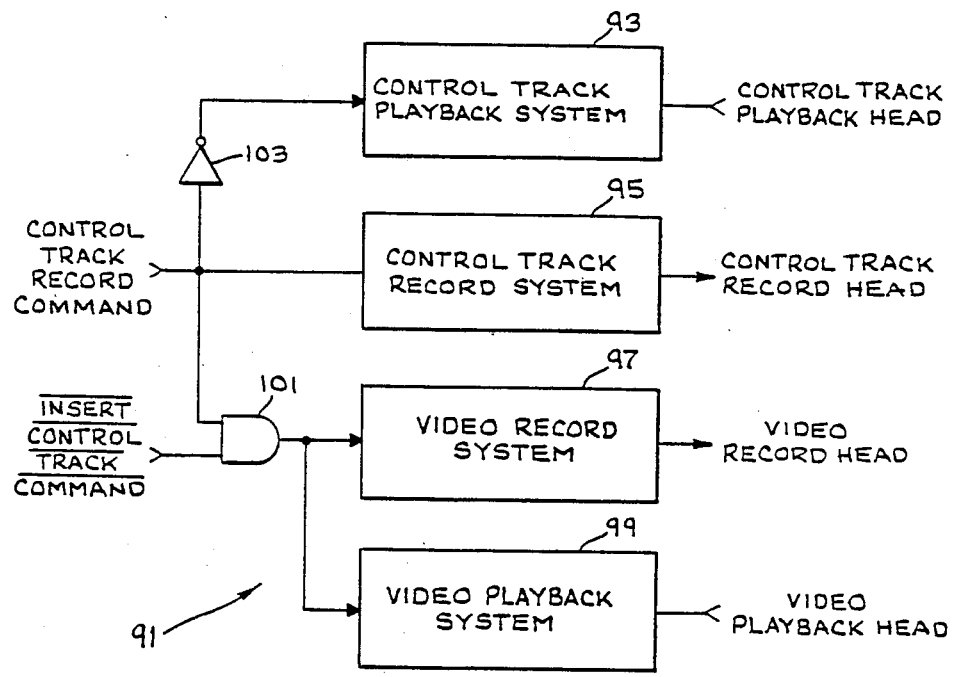
FIG_4

SYNTHETIC CONTROL TRACK SIGNAL PRODUCING APPARATUS FOR VIDEO TAPE MACHINES

This is a continuation of co-pending application Ser. No. 418,865 filed on Sept. 16, 1982, now abandoned.

BACKGROUND AND SUMMARY OF THE INVENTION

This invention relates to a method and apparatus for controlling the speed at which tape is transported in a video tape recording and/or reproducing machine, more particularly, to a method and apparatus for generating a synthetic control track signal from vertical synchronizing information included in a video signal reproduced from the tape for use in servo controlling the transport of the tape.

Magnetic video tape recording and/or reproducing machines generally operate by transporting magnetic recording tape in transducing relation to one or more rotating transducers or heads which scan the tape at a very high rate relative to the speed of transport of the tape. The heads record a plurality of generally parallel tracks on the tape which contain video information, and the same heads or other heads reproduce the recorded video information during playback by scanning the recorded tracks.

During recording, a control track head records control track signal information typically in a track extending longitudinally along one side of the tape, simultaneously as video information is recorded by a rotating video head scanning along the tape at locations spaced from the longitudinally extending control track. The control track signal information typically is a television frame rate square wave. For many helical wrap video recorders which record a field of television or video information along a single track during each revolution of the video head, the frame rate control track signal changes state once for each field of recorded video information. The control track signal information also often includes periodic color framing pulses for identifying specific fields in a multifield sequence forming the color television signal.

The longitudinal transport speed of the tape must be accurately controlled during playback. To achieve such control, many video tape recorders employ a motor driven prime mover, such as a capstan controlled by a capstan servo mechanism in accordance with a tachometer signal and with the timing relationship between a reference vertical sync signal and control track signal information reproduced from the tape during playback.

If for any reason a control track signal is improperly recorded relative to the recorded positions of the video tracks along the tape, the video head will be mispositioned relative to the recorded video track during playback operations, although the capstan servo will cause the tape to be transported at the proper playback speed. If the control track signal is not recorded on the tape, the capstan servo may not be able to move the tape at all, and even if it is able to do so, the tape transport will not be properly synchronized to the controlling reference. For example, control track information may be absent because of not being recorded on the tape during an insert edit or of, malfunctions and the like. Inaccurate control of the transport of tape also occurs if, the control track information is recorded with an improper inverted phase.

Recent developments in helical wrap video tape recording and reproducing machines have included what is commonly referred to as an automatic scan tracking system. In such machines, the reproducing head is mounted at the end of a movable element that is controllable to move the head transversely relative to the longitudinal direction of a recorded track so as to maintain the head on the track. This enables reproduction of a signal of superior quality, even when the tape is being transported at a speed other than normal reproducing speed, such as during operations for generating special motion effects of still frame reproducing, slow motion reproducing and fast motion reproducing. Such systems generate an error signal indicating whether the head is mistracking and the error signal is used in a head positioning servo for moving the movable element to return the head to the center of the recorded track. While the machine is reproducing recorded information, the error signal can be monitored to provide an indication of the tape speed deviation from normal reproduce speed as well as head to tape position deviation. Moreover, this error signal can be used to control the capstan servo to generally maintain proper tape speed and proper head to tape position. However, this error signal is not entirely reliable in providing control of the capstan servo because it does not rely on any well defined timing signals and is subject to mechanical and electrical variations which can affect the accuracy of the control of the capstan servo.

Accordingly, an object of this invention is to provide a new and improved method and apparatus for generating a synthetic control track signal for use in controlling the speed of tape transport in a video tape recording and/or reproducing machine whereby the adverse effects of improperly recorded or missing control track signals are obviated.

Another object is to provide a new and improved synthetic control track signal which is generated from vertical synchronizing signal information included in the video information reproduced from tape.

Yet another object is to provide a new and improved method and apparatus for generating a synthetic control track signal during video playback operations for use in synchronizing the transport of the tape to system reference while simultaneously recording a new control track signal on the tape.

Other objects of the present invention will become apparent from the following detailed description, in conjunction with the accompanying drawings in which:

FIG. 1A is a block diagram of apparatus for generating a synthetic control track signal in accordance with this invention;

FIG. 1B is a block diagram of a common capstan servo arranged to be operated in accordance with this invention.

FIGS. 2(a) through 2(f) are timing diagrams illustrating the relationship between normal and synthetic control track signal information, vertical synchronizing information, and the capstan servo ramp voltage;

FIG. 3 illustrates a detailed schematic of the control track error detector circuit shown in FIG. 1B; and FIG. 4 is a block diagram of a video signal record and playback system and a control track signal record and playback system arranged so that normal control track record operations can occur selectively during video playback operations.

Broadly stated, the present invention is directed to a method and apparatus for generating a synthetic control track signal during the reproduction of recorded video information for use in a video tape recording and reproducing machine. The synthetic control track signal is utilized to control the capstan servo for moving the tape at the normal reproducing speed when the control track signal recorded on tape is defective or nonexistent so that the tape transport is maintained in synchronism with the system reference. It should be appreciated that when many helical wrap recording machines perform an insert edit operation, i.e., they record new material over a prior recording, the new material is added without recording a new control track signal . If an insert edit recording operation is performed on a portion of previously unrecorded or blank tape, there obviously will not be a control track signal recorded along the blank portion of the tape. If this occurs, then upon subsequent reproducing of the new material, the capstan servo will be unable to operate properly because of the absence of the control track signals in the portion of the tape corresponding to the recorded location of the new material.

In accordance with the present invention a synthetic control track signal is generated from recorded video information signals, which is applied to the capstan servo otherwise operated in a conventional manner. The synthetic control track generating circuitry embodying the present invention is also adapted to insert the color frame field identification pulses in the synthetically generated control track signal. In other words, a field one identification pulse is applied to the control track square wave signal. Another feature of the present invention is that the synthetic control track signal can be used to control the capstan servo to transport the tape at the proper speed during reproducing, and if a control track signal is missing from the control track on the tape, the control track record circuitry can be activated for the purpose of recording a control track signal at the missing location. Once the control track is recorded in the conventional manner, then the tape may be played in the normal fashion by any conventional recording and reproducing machine.

The synthetic control track signal generating circuitry utilizes the field one identification signal from a common color frame circuit included in video tape recording and/or reproducing machines, which in and of itself does not form a part of the present invention. The field one identification signal, together with playback vertical sync are used to generate the synthetic control track signal. It should be appreciated that the relationship of the conventionally recorded control track signal to vertical sync is such that each field rate transition of the control track signal is recorded on the tape approximately half way between the occurrences of successively reproduced vertical sync signals. In the circuitry of the present invention, the transitions of the synthetic control track are generated to occur essentially coincident with the occurrence of vertical sync, which means that they are offset relative to the occurrences of reproduced conventionally recorded control track transitions. However, the offset can be compensated for in the conventional capstan servo with only slight modification.

More particularly, it should be appreciated that the control track signals are recorded and reproduced by a fixed head and that the control track transitions are reproduced in response to the tape being moved relative to the control track head. It should also be appreciated that the speed of transport of the tape is relatively slow compared to the speed of rotation of the head that reproduces the recorded video information from which the synthetic control track signal is derived. The movement of the rotating video head the longitudinal direction of the tape as it reproduces video information is approximately 100 times the speed of movement of the tape past the control track head. In deriving the synthetic control track signal from the reproduced video information, it is necessary to compensate for this significant difference in relative head to tape speeds. In a conventional capstan servo, such as employed in the VPR-20 Video Production Recorder manufactured by Ampex Corporation, the control track error detector includes means for generating a voltage ramp by charging a capacitor and, at a particular time, the value of the ramp is sampled to obtain a control track determined tape speed related error voltage that is applied to the capstan servo for the purpose of controlling the capstan drive and, hence, tape speed. The ramp is reset by a reference frame sync related signal and the ramp is sampled by the occurrence of a reproduced control track transition. Because the movement of the rotating video reproduce head relative to the transported tape is 100 times faster than the movement of the tape past the control track head, it is necessary to increase the slope of the generated ramp by a corresponding factor of 100 without changing the rate of the generation of the ramp signals. When this is done, the relative timing of the sampling of the ramp in accordance with the present invention is slightly different from the timing of the sampling in the conventional capstan servo, but it is approximately the same by virtue of the fact that the synthetic control track signal is essentially synchronized to the reproduced off tape vertical sync extracted from the reproduced video signal. However, there is a small difference. For this reason, when the capstan servo is operated under the control of the synthetic control track signal, the reference vertical sync that is applied to reset the ramp is slightly advanced in time relative to the time of occurrence of the actual reference vertical sync normally used for such purpose.

Stated in other words, the synthetic control track signal has transitions coincident with vertical sync which means that the occurrence of a control track transition is approximately 180° out of phase relative to a conventional control track transition. However, the ramp generator has a ramp slope that is 100 times steeper than the slope of the ramp signal used in a conventional capstan servo, which means that in the capstan servo of the present invention the ramp signal generated in the control track error detector must be sampled much sooner relative to a ramp signal in the conventional capstan servo. The reference vertical sync signal which resets the ramp when a synthetic control track is used is normally delayed in the conventional capstan servo by a full field in circuitry that does not in and of itself form a part of the present invention. By shortening the delay by a small amount, the delayed reference vertical sync will be advanced in time a small amount relative to that found in the conventional capstan servo. This has the effect of providing the final correction to the capstan servo so that the control track related error signal that the capstan servo uses to control the capstan speed is essentially identical, whether the synthetic control track or the conventional control track signal is used to sample the ramp signal.

Turning now to the drawings, the manner in which the synthetic control track signal is generated in accordance with the present invention is shown in FIG. 1A. Vertical sync is extracted from the reproduced video information by conventional circuitry (not shown) found in the aforementioned Ampex manufactured video tape recording and/or reproducing machine as the playback video head scans the various tracks, and is provided at an input 12 and coupled to the clock input of a flip-flop 16. A No. 1 field identification signal (of a four field sequence in a NTSC format color video information signal and of an eight field sequence in a PAL format color video information signal) also conventionally extracted from the reproduced video information signal is provided over line 20 to a delay one shot circuit 28. The delay circuit 28 provides an output signal to the "set" input terminal of the flip-flop 6 to synchronize the same to the occurrence of the field No. 1 identification signal. The time constant of the one shot circuit 28 is set to properly locate the leading edge of the field No. 1 identification signal relative to the proximate control track transition of the synthetic control track signal into which the identification signal is inserted. When connected as shown, the flip-flop 16 is clocked by play back vertical sync and operates as a divide by two divider and provides a 30 Hertz (Hz) frame rate square wave signal at its output. The period of the square wave signal generated by the flip-flop 16 is therefore equal to that of a normal control track signal and, therefore, the generated synthetic control track signal is a replica of the normal control track signal. However, the 60 Hz rate transitions of the square wave signal are coincident with the 60 Hz vertical sync signal, whereas the transitions of conventional control track signals are offset relative to vertical sync, as is shown by FIGS. 2(a) and 2(c).

The square wave signal is employed to form a synthetic control track signal and, preferably, is combined with a short pulse to provide field identification information. The field identification pulse is added to the synthetic control track square wave signal synthesized by the flip-flop 16. The circuitry shown in FIG. 1A generates a narrow pulse in response to the receipt of the field No. 1 identification signal. It is delayed by the amount of the delay provided by the one shot 28. The delay circuit 28 times out and its Q-not output is coupled to trigger a monostable multivibrator, or one-shot 30. The one-shot 30 responsively produces a narrow pulse at the proper time for adding to the square wave signal as the desired field identification signal and has a controlling time constant that is set to effect the generation of a field No. 1 identification signal of common duration for insertion in the synthetic control track signal. For a NTSC format color video information signal system, the field No. 1 identification signal is inserted in the synthesized square wave signal to occur every two periods of the signal, since the identification signal is at a rate of 15 HZ (or ½ the frequency of the 30 HZ square wave signal). For a PAL system, the field No. 1 identification signal is at a rate of ¼ the frequency of the synthesized square wave signal, hence, is inserted to occur every four periods of the synthesized signal. The output of the one-shot 30 is combined with the square wave of the flip-flop 16 in an NAND gate 18, and a synthetic control track signal having two components, one the narrow pulse or field identification signal and the other the square wave signal or frame related signal, is produced at an output 32.

As previously mentioned, the timing of the synthetic control track is different from that of the conventional control track signal, which signal requires some modification for use in the operation of a capstan servo. When the tape is driven at the proper speed under servo control relative to the conventional control track and capstan tachometer signals, the control track signal transitions occur between vertical sync pulses as shown in FIGS. 2(a) and 2(c). With reference to FIG. 1B, the capstan servo 41 included in the aforementioned Ampex manufactured video production recorder includes a control track error detector 43 that generates a control track related error signal in the form of a tape speed related voltage level that controls a following voltage controlled oscillator 45, which provides an output signal at a frequency that determines the speed of the capstan motor. This output signal is coupled to one input of a capstan tachometer error detector 47 and serves as a reference signal for comparison to the capstan tachometer signal. This error detector 47 provides a capstan servo error signal that is coupled to the capstan motor drive amplifier circuit 49 that responsively controls the drive provided to the capstan motor (not shown) to maintain the transport of the tape at the desired speed.

The control track related error signal is generated by sampling a ramp output of a linear ramp generator, with the sample being taken and held at a particular time, such as at the time of occurrence a control track transition. The ramp is reset by a delayed reference vertical sync signal. Referring to FIGS. 2(b) and 2(c), the servo is controlled by a conventional control track signal as shown. Samples are taken at the occurrences of control track transitions, which nominally occur at the midpoints of the occurrences of the voltage ramp signal when the tape is transported at the correct normal playback speed. Variations in the occurrences of the control track transitions relative to the generation of the ramp signal result in the ramp signal being sampled at points along the slope of the ramp signal which are either higher (tape speed too slow) or lower (tape speed too fast) than the midpoint of the ramp signal.

If a control track signal is generated using vertical sync pulses extracted from the video information signal reproduced by the rotating video playback head, the slope of the ramp must be increased because the head rotates, hence, scans along the tape much faster than the longitudinal speed of transport of the tape past the control track playback head In an interval corresponding to about the duration of 2½ horizontal lines, or about 0.01 of the duration of a video field, the video head passes a longitudinal length of tape which corresponds to the distance the tape moves relative to the conventional stationary control track playback head during the reproduction of one video field. To compensate for the loss in sensitivity produced by the 100 times increase in the head to tape speed of the video head relative to the head to tape speed of the control track playback head, the slope of the ramp must be increased by the same factor to obtain the same resulting sensitivity.

When the synthetic control track signal is used to control the capstan servo, the slope of the ramp is sharply increased as shown by comparing FIGS. 2(b) with an exaggerated slope shown in FIG. 2(e). The slope is increased by switching switch 42 (FIG. 3) to a position opposite that shown, which effectively removes the larger capacitor 44 from the ramp generating circuit included in the control track error detector 43 (FIG. 1B) and indicated generally at 51. The ramp is reset by switch 52 responsive to the aforementioned delayed reference vertical sync. The delayed reference vertical sync is generated with an amount of delay which is changed depending upon whether regular or synthetic control track signals are used in the control track error detector 43. The delayed vertical sync is normally delayed by an interval corresponding approximately to the time of a full video field and, in the synthetic control track mode, it is delayed by a slightly lesser amount to form an advanced reference vertical signal, as shown by comparing FIGS. 2(a) with 2(d). The ramp is therefore reset slightly earlier by the advanced reference vertical signal than would otherwise occur, as seen by comparing FIGS. 2(b) and 2(c).

An important consideration is that the timing of the ramp signal sampling in the control track error detector 43 is controlled so that the desired nominal zero tape speed error voltage level is identical whether the machine is using actual or synthetic control track signals, as is evident from the sample point elevations shown in FIGS. 2(b) and 2(e). This permits the remainder of the capstan servo 41 to operate normally.

The details of a preferred ramp generating and sampling circuitry included in the control track error detector 43 is shown in FIG. 3. Either the normal control track or the synthetic control track signal is selected for coupling to an input line 38 by an operator controlled switch 53 shown in FIG. 1B. Similarly, the normally delayed or advanced reference vertical signal is selected for coupling to an input line 40 by another operator controlled switch 55 shown in FIG. 1B, the switches 53 and 55 being conjointly operated. During normal control track operation, the switch 42 is in the up position shown, and capacitors 44 and 46 are connected to an input of a buffer 48. The capacitance of the capacitor 44 is about 100 times greater than the capacitance of the capacitor 46, and both capacitors are charged by a current source 50, producing a ramp voltage at the output of the buffer 48. The delayed reference vertical sync signal, which is in the form of a pulse train, received over input line 40 resets the ramp by moving a switch 52 to the illustrated up position whereby the charges on the capacitors 44 and 46 are drained to ground. The switch 52 is activated by the delayed reference vertical sync applied on input line 40 through the switch 55 (FIG. 1B). When the operator initiates operation of the synthetic control track mode by operation of the switches 53 and 55 (FIG. 1B), an active signal is placed on line 92 by the simultaneous closure of switch 55a. This causes switches 42 and a switch 94 to be switched to respective positions opposite those that are shown.

The ramp voltage output of the buffer 48 is sampled by the control track sample pulses corresponding to control track transitions, which occur on input line 38 at the 60 Hz field rate and actuate a switch 54. The switch 54 is closed for a very short time responsive to a control track sample signal being applied thereto via line 38 and simultaneously the supply of current by source 50 is interrupted to maintain a constant level of charge on the capacitors 44 and 46 during the sampling interval. The sampled voltage is stored in a capacitor 56, which provides an input to a unity gain buffer 58. The output of the buffer 58 provides a control signal via amplifier 60 and line 82 to the voltage controlled oscillator 45 included in the capstan servo 41.

During normal control track operation, the switch 42 is in the position shown, and the capacitor 44 is in the circuit and can be charged. If the synthetic control track is to be used, the switch 42 is switched as described herein before to the down position alternate to that shown to isolate the capacitor 44 from the circuit. Since the capacitance of the capacitor 44 is about 100 times greater than that of the capacitor 46, the slope of the ramp will be about 100 times greater when the capacitor 44 is isolated as described.

The output of the buffer 58 is applied to an amplifier 60 which includes a feedback network having four diodes 62, 64, 66 and 68, connected as shown. The diodes 62, 64, 66 and 68 limit the dynamic range of the correction by limiting the maximum speed error signal which may be generated as a result of a possible track jump that can occur with a machine that has an automatic scan tracking system of the type previously described.

Existing video tape recording and/or reproducing machines are arranged to have their control track signal record and playback system and video signal record and playback system in the same record or playback mode, other than such machines arranged to perform confidence recording operations. In machines so arranged, the video signal record system and video signal playback system are simultaneously enabled so that as video information is being recorded by one video head a separate video head reproduces previously recorded video information. During such operation, however, the transport of the tape is not servo controlled with respect to recorded control track. The generation of the synthetic control track signal in accordance with the present invention now makes it possible to synchronously operate a video tape recording and/or reproducing machine so that normal video playback operations and control track record operations can synchronously occur relative to the system reference in the absence of a control track signal or the presence of an improperly recorded control track signal. As described hereinbefore, this is made possible because the synthetic control track signal permits the control of the transport of the tape synchronously with the system reference during normal video playback operations without need of control track signals reproduced from the tape. As explained hereinbefore, the synthetic control track signal is generated from the vertical sync signal extracted from the reproduced video information signal. Therefore, the capstan record/play back signal system and video record/playback signal system can be in opposite operating modes, including the control track signal system in a record mode while the video signal system is in a playback mode. This enables the control track signal system to be operated to record a new control track signal on a tape when the video signal system is reproducing previously recorded video information from the same tape.

The foregoing will be further appreciated upon consideration of FIG. 4, which illustrates a control track signal and video signal record and playback system 91 of a typical video tape recording and/or reproducing machine, such as the aforementioned Ampex manufactured video production recorder. As illustrated in FIG. 4, the control track signal playback system 93 has its control track signal input coupled to a control track playback head (not shown) and the control track signal record system 95 has its control track signal output coupled to a control track record head (not shown). In practice, a single head serves to record and playback control track signals with respect to the tape, that head being switched electronically to the proper part of the control track signal system in accordance with operating mode selected for the system. Similarly, the video signal record system 97 has its video signal output coupled to a video record head (not shown) and the video signal playback system 99 has its video signal input coupled to a video playback head (not shown). In practice, a single video head can be used for both recording and playback operations, with an electronically controlled switch coupling the video head to the proper part of the video signal system in accordance with the operating mode seleted for the system. The aforedescribed control track and video signal systems may be conventional systems found in existing video tape recording and/or playback machines. However, in accordance with the present invention, the operating modes of the control track signal system and video signal system are controlled relative to the operation of the synthetic control track signal generator so that the two systems can be in opposite operating modes, namely, the control track signal system in the record mode while the video signal system is in the playback mode. This is achieved by the generation of two operator initiated commands; one being the control track record command that is coupled to enable the control track record system 95, and the other an inverted form of the insert control track command. The two commands are coupled to separate inputs of an AND gate 101, for selectively disabling the video signal record system 97 while enabling the video signal playback system 99 when an insert control track command is generated coincidentally with the control track record command. More specifically, the AND gate 101 generates logical low level output which is coupled to the video signal record system 97 and the video playback system 99 in the absence of an insert control track command, signified by a logical low level signal at the input to the AND gate. This logical low level signal at the output of the AND gate 101 has no effect on the control of the operative mode of the video signal system. When an insert control track command is generated, however, a logical high level signal is coupled to the input of the AND gate 101 and, if a control track record command is also received at the input of the AND gate, the output of the AND gate is at a logical high level. The logical high level signal disables the video signal record system 97 while enabling the video signal playback system 99, whereby the video signal system can not be placed in a record mode but is able to be operated in the playback mode. The control track record command is also coupled to the control track signal record system 95 and through an inverter 103 to the control track signal playback system 93. The presence of a control track record command enables the control track record system 95 while simultaneously disabling the control track playback system 93. In this manner, new control track signals can be recorded on a tape through the normal operation of the control track signal record system 95 while video information is simultaneously reproduced from the tape through the normal operation of the video signal playback system 99.

By generating a synthetic control track in the manner described, the capstan and tape speed can be properly controlled during reproducing even when there is no recorded control track signal, or when the control track signal has been improperly recorded. Also, control track signals can be recorded so that the tape (or other record media) will have a properly recorded control track signal for future reproduction.

It should be understood that although preferred embodiments of the present invention have been illustrated and described, various modifications thereof will become apparent to those skilled in the art. In helical scan video tape recording and/or reproducing machines, it is possible to generate a synthetic control track signal from the vertical sync signal extracted from the reproduced video information signal because the extracted vertical sync signal is related in time to a properly recorded control track signal and the time bases of the information signal and control track signal are proportional to the speed of transport of the tape. Consequently, any control track signal or other comparable timing signal recorded on tape or other record media can be synthesized in accordance with the present invention from a known timing component included in an information signal if the recorded information signal and timing signal are related in time, and the time bases of the recorded information signal and timing signal are proportional to the relative timing signal head to media speed. Accordingly, the scope of the present invention should be defined only by the appended claims and equivalents thereof.

Various features of the invention are set forth in the following claims.

What is claimed is:

1. Apparatus for generating a signal that is a replica of a control track signal of the type recorded along a track on a record medium for synchronizing the reproduction of video information signals from the record medium by a video recording and/or reproducing machine, the control track signal having a selected periodic waveform for recording on the record medium synchronously with a vertical sync signal component included in video information signals that are recorded on the record medium, said apparatus comprising:
    means for reproducing the vertical sync signal component recorded on the record medium;
    a signal generator responsive to the reproduced vertical sync signal component for generating a synthetic control track signal having a waveform that is a replica of the selected periodic waveform of said control track signal and is synchronized to the occurrence of the reproduced vertical sync component; and
    means for coupling the synthetic control track signal to the video recording and/or reproducing machine for use thereby in place of said control track signal having the selected periodic waveform.

2. Apparatus as defined in claim 1 wherein the signal generator generates a synthetic control track signal having waveform in the form of a square wave, and further comprising means for inserting a narrow pulse in said square wave signal adjacent a predetermined transition occurring during an interval corresponding to a multiple of the square wave period.

3. Apparatus as defined in claim 2 wherein said predetermined period is equivalent to the period of the control track signal.

4. Apparatus as defined in claim 2 wherein said predetermined transition is a negative-going transition of said square wave signal.

5. Apparatus as defined in claim 2 wherein said multiple of the square wave period is two for a video information signal having an NTSC format.

6. Apparatus as defined in claim 2 wherein said multiple of said square wave period is four for a video information signal having a PAL format.

7. Apparatus as defined in claim 2 wherein said pulse inserting means comprises a monostable multivibrator which produces a narrow pulse responsive to receiving a delayed field identification signal being applied thereto, and a logic gate connected to said multivibrator and said square wave signal generator for combining said signals.

8. Apparatus as defined in claim 2 wherein said square wave signal generator comprises a first digital device which generates a frame rate square wave signal clocked by the vertical sync signal reproduced by said rotating reproduce head, and a monostable multivibrator responsive to field identification information contained in a multifield reference signal, said monostable multivibrator coupled to provide an input to said first digital device for synchronizing said square wave signal generator to a predetermined field in a multifield sequence of the reference signal.

9. Apparatus as defined in claim 1 wherein the selected periodic waveform of said control track signal has a first component of a first period and a second component of a second period greater than said first period, said second component synchronously occurring in relation to said first component, and the signal generator generates a synthetic control track signal having a composite waveform that includes two synchronously occurring components that are replicas of said first and second components of the selected periodic waveform of said control track signal.

10. Apparatus as defined in claim 9 wherein the video information signal recorded on the record medium includes synchronizing signal information that identifies the occurrence of a selected field in a sequence of a plurality of consecutive fields forming the video information signal, the first component of the selected periodic waveform occurs in the control track signal at a time corresponding to the occurrence of the vertical sync signal component included in the recorded video information signal, the second component of the selected periodic waveform occurs in the control track signal at a time corresponding to the occurrence of the identified selected field, the signal generator includes first and second signal generators, said first signal generator is responsive to said vertical sync signal component reproduced from the record medium to generate a first of said two synchronously-occurring components that is a replica of said first component of the selected periodic waveform and of a duration corresponding to one period of said first component, and said second signal generator is responsive to each reproduction of synchronizing signal information that identifies the occurrence of the selected field to generate a second of said two synchronously occurring components that is a replica of said second component of the selected periodic waveform and of a duration corresponding to one period of said second component.

11. Apparatus as defined in claim 10 wherein the first component of the selected periodic waveform is a square wave signal, the second component of the selected periodic waveform is a narrow pulse signal, and the first and second signal generators generate replicas of the square wave signal and narrow pulse signal, with the narrow pulse signal occurring adjacent a predetermined one of transitions of the square wave signal occurring during an interval corresponding to a multiple of the period of the square wave signal.

12. A servo for controlling the relative information head to media transport speed with respect to a reference timing signal in an information signal recording and/or reproducing machine having an information head for reproducing information signals recorded on the media and a control head for reproducing a control timing signal recorded on the media so that the time base of the control timing signal is indicative of the relative information head to media transport speed, said information signal containing a known timing component related in time to the control timing signal and whose time base is proportional to the relative control head to media transport speed; comprising:
  means responsive to the occurrence of the timing component reproduced from the media for generating a synthetic control timing signal that is a replica of the control timing signal recorded on the media;
  means responsive to a control timing signal and the reference timing signal for generating an error signal proportional to timing differences between said control timing signal and said reference timing signal;
  means for selectively coupling to the error signal generating means one of the control timing signal reproduced from the media and the synthesized control timing signal; and
  means responsive to the error signal for controlling the relative transport of the media and information head in accordance with the timing differences represented by said error signal.

13. Apparatus as defined in claim 12 wherein the information signal is reproduced from the media at a relative head to media speed that is higher than that at which the control timing signal is reproduced, and further comprising means for increasing the sensitivity of the error signal generating means when the synthesized control timing signal is coupled thereto by the coupling means.

14. In a magnetic video tape recording and/or reproducing machine of the type which has a capstan, capstan servo for controlling the capstan during recording and/or reproducing operations with a tape whose transport is controlled by the capstan, and a stationary control track head for recording and/or reproducing control track signal information with respect to the tape for use by the capstan servo, apparatus for generating synthetic control track signal from video information recorded on the tape, comprising:
  means for generating a square wave signal having a predetermined period
  in response to and synchronously with a video information vertical sync signal reproduce from the tape; and
  means for inserting a narrow pulse periodically in said square wave signal adjacent a predetermined square wave transition , the period of occurrence of the narrow pulse corresponding to a predetermined multiple of the square wave period.

15. In a helical wrap magnetic video tape recording and/or reproducing machine of the type which has a capstan, a capstan servo for controlling the capstan during recording and/or reproducing operations with a tape whose transport is controlled by the capstan, a control track head for recording and/or reproducing control track signal information with respect to the tape for use by the capstan servo, and a rotatable video head that reproduces video information from the tape at a relative head to tape speed that is higher than that at which the control track head reproduces control track signal information, said capstan servo being of the type which includes a ramp generator that is reset by a reference vertical sync signal, which ramp is sampled by a sample and hold circuit controlled by transitions of the control signal for generating an error signal for controlling the capstan servo, apparatus for controlling the capstan during reproducing operations, comprising:

means for generating a square wave signal having a predetermined period in response to and synchronously with a vertical sync signal included in video information and reproduced from the tape by the video head;

means for increasing the slope of the ramp produced by the ramp generator by a factor corresponding to the increase in the relative head to tape speed associated with the video head over the relative head to tape speed associated with the control track head;

means for adjusting the timing of the resetting of said ramp generator to thereby enable the generated ramp to be sampled when its slope is increased at the same nominal voltage as would occur using the control track signal reproduced from the tape; and means for sampling the ramp to generate an error signal for use by the capstan servo.

16. Apparatus as defined in claim 15 further comprising means for inserting a narrow pulse periodically in said square wave signal adjacent a predetermined square wave transition, the period of occurrence of the narrow pulse corresponding to a predetermined multiple of the square wave period.

17. In a magnetic video tape recording and/or reproducing machine of the type which has a capstan, capstan servo for controlling the capstan during recording and/or reproducing operations with a tape whose transport is controlled by the capstan and a stationary control track head for recording and/or reproducing control track signal information with respect to the tape for use by the capstan servo, a method of generating a synthetic control track signal from video information recorded on the tape, comprising the steps of:

generating a square wave signal of a predetermined period in response to and synchronously relative to the occurrence of a vertical sync signal included in video information and reproduced from the tape by a video head; and periodically inserting a narrow pulse in said square wave signal adjacent a predetermined square wave signal transition, the period of occurrence of the narrow pulse corresponding to a predetermined multiple of the square wave period.

18. The method of claim 17 wherein said predetermined period is equivalent to the period of the control track signal recorded on tape.

19. The method of claim 17 wherein said predetermined transition is a negative-going transition of said square wave signal.

20. The method of claim 17 wherein said predetermined multiple of the square wave period is two for a video information signal having an NTSC format.

21. The method of claim 17 wherein said predetermined multiple of said square wave period is four for a video information signal having a PAL format.

22. In a helical wrap magnetic video tape recording and/or reproducing machine of the type which has a capstan, a capstan servo for controlling the capstan during recording and/or reproducing operations with a tape whose transport is controlled by the capstan, a control track head for recording and/or reproducing control track signal information with respect to the tape for use by the capstan servo, and a rotatable video head that reproduces video information from tape at a relative head to tape speed that is higher than that at which the control track head reproduces control track signal information, said capstan servo being of the type which includes a ramp generator that is reset by a reference vertical sync signal, which ramp is sampled by a sample and hold circuit controlled by control track transitions of the control signal for generating an error signal for controlling the capstan servo, a method of controlling the capstan during reproducing operations, comprising the steps of:

generating a square wave signal having a predetermined period synchronously relative to the occurrence of a vertical sync signal included in the video information and reproduced from the tape by the video head;

increasing the slope of the ramp produced by the ramp generator by a factor corresponding to the increase in the relative head to tape speed associated with the video head over the relative head to tape speed associated with the control track head;

adjusting the timing of the resetting of said ramp generator to thereby enable the generated ramp to be sampled when its slope is increased at the same nominal voltage as would occur using the control track signal reproduced from the tape; and sampling the ramp to generate an error signal for use by the capstan servo.

23. A method as defined in claim 22 wherein said slope is increased by a factor of 100.

24. Method as defined in claim 22 further comprising the step of inserting a narrow pulse periodically in said square wave signal adjacent a predetermined square wave transition, the period of occurrence of the narrow pulse corresponding to a predetermined multiple of the square wave period.

25. A servo for controlling the transport of a tape with respect to a reference timing signal in a magnetic video tape recording and/or reproducing machine having a control track head for reproducing a control track signal recorded longitudinally along the tape and a video head for reproducing video information, including a vertical sync signal, which is recorded along the tape in a path extending other than perpendicular to the length of the tape; comprising:

means responsive to the occurrence of a vertical sync signal reproduced from the tape for generating a synthesized control track signal corresponding to the control track signal recorded on the tape;

a comparator for comparing a control track signal coupled thereto and the reference timing signal to generate an error signal proportional to timing differences between the compared signals;

means for coupling the synthesized control track signal to the comparator; and means responsive to the error signal for controlling the transport of the tape in accordance with the timing difference represented by said error signal.

26. Apparatus as defined in claim 25 wherein the coupling means is responsive to selectively couple to the comparator one of the control track signal reproduced from the tape and the synthesized control track signal provided by the generating means.

27. Apparatus as defined in claim 26 wherein the video information is reproduced from the tape at a relative head to tape speed that is higher than that at which the control track signal is reproduced, and further comprising means for increasing the sensitivity of the comparator when the synthesized control track signal is coupled thereto by the coupling means.

28. Apparatus as defined in claim 27 wherein the comparator includes a ramp generator and a ramp sampling means, said ramp generator generates a ramp signal of selected slope and is responsive to the reference timing signal for terminating the ramp signal, the ramp sampling means is coupled to sample the ramp signal in response to and at a time determined by the control track signal coupled thereto by the coupling means and generate the error signal, and the sensitivity increasing means includes means for causing the ramp generator to generate a ramp signal of greater slope when the synthesized control track signal is coupled to the ramp sampling means by the coupling means, said slope of the ramp signal being greater than that when the control track signal reproduced from the tape is coupled to the ramp sampling means by a factor corresponding to the difference between the relative head to tape speed at which video information is reproduced from the tape and that at which the control track signal is reproduced.

29. A servo for controlling the relative information head to media transport speed with respect to a reference timing signal in an information signal recording and/or reproducing machine having an information head for reproducing information signals recorded on the media and a control head for reproducing a control timing signal recorded on the media so that time base of the control timing signal is indicative of the relative information head to media transport speed, said information signal containing a known timing component related in time to the control timing signal and whose time base is proportional to the relative control head to media transport speed; comprising:
means responsive to the occurrence of the timing component reproduced from the media for generating a synthesized control timing signal corresponding to the control timing signal recorded on the media;
a comparator for comparing a control timing signal coupled thereto and the reference timing signal to generate an error signal proportional to timing differences between the compared signals;
means for coupling the synthesized control timing signal to the comparator; and
means responsive to the error signal for controlling the relative transport of the media and information head in accordance with the timing differences represented by said error signal.

30. Apparatus as defined in claim 29 wherein the coupling means is responsive to selectively couple to the comparator one of the control timing signal reproduced from the media and the synthesized control timing signal provided by the generating means.

31. Apparatus as defined in claim 30 wherein the information signal is reproduced from the media at a relative head to media speed that is higher than that at which the control timing signal is reproduced, and further comprising means for increasing the sensitivity of the comparator when the synthesized control timing signal is coupled thereto by the coupling means.

32. A method of recording a control track signal longitudinally along a tape transported in a helical path under the control of a capstan servo as video information is reproduced from the tape, said reproduced video information containing a vertical sync signal and reproduced by a helical scan video tape recording and/or reproducing machine including a control track signal record and/or reproduce system and a video information signal record and/or reproduce system; the steps comprising:
generating a synthesized control track signal from the vertical sync signal reproduced from the tape;
controlling the capstan servo with the synthesized control track signal;
disabling the control track signal record and/or reproduce system from reproducing recorded control track signals while enabling such system to record control track signals; and
enabling the video information signal record and/or reproduce system to reproduce recorded video information signals while disabling such system from recording video information signals.

* * * * *